United States Patent
Lin et al.

(10) Patent No.: US 11,621,870 B2
(45) Date of Patent: Apr. 4, 2023

(54) SOUNDING REFERENCE SIGNAL (SRS) TRANSMISSION FOR POSITIONING ON FLEXIBLE SYMBOLS

(71) Applicant: QUALCOMM Incorporated, San Diego, CA (US)

(72) Inventors: Yih-Hao Lin, San Diego, CA (US); Xiaoxia Zhang, San Diego, CA (US); Alexandros Manolakos, Escondido, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 17/177,522

(22) Filed: Feb. 17, 2021

(65) Prior Publication Data

US 2021/0314195 A1  Oct. 7, 2021

Related U.S. Application Data

(60) Provisional application No. 63/006,645, filed on Apr. 7, 2020.

(51) Int. Cl.
*H04W 72/04* (2023.01)
*H04L 25/02* (2006.01)
(Continued)

(52) U.S. Cl.
CPC ........ *H04L 25/0226* (2013.01); *H04L 5/0048* (2013.01); *H04W 72/0446* (2013.01);
(Continued)

(58) Field of Classification Search
CPC .. H04L 25/0226; H04L 5/0051; H04W 80/02; H04W 72/042; H04W 72/0446;
(Continued)

(56) References Cited

U.S. PATENT DOCUMENTS

| 9,226,290 B2 | 12/2015 | Gaal et al. | |
|---|---|---|---|
| 2012/0113866 A1* | 5/2012 | Tenny | H04W 24/10 |
| | | | 370/254 |

(Continued)

OTHER PUBLICATIONS

International Search Report and Written Opinion—PCT/US2021/018459—ISA/EPO—dated May 26, 2021.
(Continued)

*Primary Examiner* — Wei Zhao
(74) *Attorney, Agent, or Firm* — Weaver Austin Villeneuve & Sampson LLP

(57) ABSTRACT

Sounding Reference Signal (SRS) transmission for positioning can be utilized on flexible symbols. Techniques disclosed for transmitting a reference signal for positioning comprise receiving, from a serving base station, a message comprising an indication to transmit a SRS on a set of symbols of an orthogonal frequency division multiplexing (OFDM) slot. Techniques may also comprise determining the SRS is to be used for positioning, and receiving, from the serving base station, downlink control information (DCI) having a slot format indicator (SFI) that designates a subset of the set of symbols as flexible. Techniques may also comprise transmitting the SRS on at least a portion of the subset.

30 Claims, 6 Drawing Sheets

(51) Int. Cl.
  *H04L 5/00* (2006.01)
  *H04W 80/02* (2009.01)
  *H04W 72/0446* (2023.01)
  *H04W 76/27* (2018.01)
  *H04W 72/23* (2023.01)

(52) U.S. Cl.
  CPC ........... *H04W 72/23* (2023.01); *H04W 76/27* (2018.02); *H04W 80/02* (2013.01)

(58) Field of Classification Search
  CPC . H04W 76/27; H04W 72/044; H04W 74/008; H04W 74/006; H04W 74/0841
  See application file for complete search history.

(56) References Cited

U.S. PATENT DOCUMENTS

| | | | |
|---|---|---|---|
| 2014/0226540 A1* | 8/2014 | Park | H04L 5/14 370/279 |
| 2019/0215126 A1* | 7/2019 | Choi | H04W 72/0413 |

OTHER PUBLICATIONS

Qualcomm Incorporated: "DL and UL NR Positioning Procedures", 3GPP Draft, 3GPP TSG-RAN WG2 Meeting #107, R2-1909416, (Positioning Procedures), 3rd Generation Partnership Project (3GPP), Mobile Competence Centre, 650, Route Des Lucioles, F-06921 Sophia-Antipolis Cedex, France, vol. RAN WG2, No. Prague, CZ, Aug. 26, 2019-Aug. 30, 2019 Aug. 16, 2019 (Aug. 16, 2019), pp. 1-10, XP051767216, Retrieved from the Internet: URL: http://www.3gpp.org/ftp/tsg_ran/WG2_RL2/TSGR2_107/Docs/R2-1909416.zip. [retrieved on Aug. 16, 2019] sections 1, 2, 4, 4.2.

Qualcomm Incorporated: "Summary #2 of Remaining Issues on PHY Procedures for NR Positioning Measurements", 36PP Draft, 3GPP TSG-RAN WG1 Meeting #100-e, R1-2001168, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Feb. 24, 2020, Feb. 24, 2020 (Feb. 24, 2020), XP051853714, 23 Pages, Retrieved from the Internet: URL: https://ftp.3gpp.Org/tsg_ran/WG1_RL1/TSGR1_100_e/Docs/R1-2001168.zip. R1-2001168 (Summary for 7.2.8.4-PHY procedures for positioning measurements) v7-clean.docx [retrieved on Feb. 24, 2020] p. 11.

* cited by examiner

SOUNDING REFERENCE SIGNAL (SRS) TRANSMISSION FOR POSITIONING ON FLEXIBLE SYMBOLS

RELATED APPLICATIONS

This application claims the benefit of U.S. Provisional Application No. 63/006,645, filed Apr. 7, 2020, entitled "SRS TRANSMISSION FOR POSITIONING ON FLEXIBLE SYMBOLS INDICATED BY SFI", which is assigned to the assignee hereof, and incorporated herein in its entirety by reference.

BACKGROUND

1. Field of Invention

The present invention relates generally to the field of wireless communications, and more specifically to determining the location or position of a mobile electronic device in a wireless communication network.

2. Description of Related Art

Determining the location of a mobile electronic device (referred to herein as a User Equipment (UE)) in a wireless network use wireless radio frequency (RF) signaling between the UE and terrestrial transceivers of the network. In Fifth Generation New Radio (5G NR, also referred to herein simply as "NR") wireless networks, defined by the $3^{rd}$ Generation Partnership Project (3GPP), positioning technologies can include downlink (DL)-only, uplink (UL)-only, and DL+UL positioning methods. For UL-only and DL+UL positioning methods, UL signals (signals sent from the UE to the terrestrial transceivers (base stations) may comprise a Sounding Reference Signal (SRS), which can be communicated using symbols in a Orthogonal Frequency Division Multiplexing (OFDM) slot designated for UL signaling.

BRIEF SUMMARY

An example method at a user equipment (UE) of transmitting a reference signal for positioning, according to this disclosure, comprises receiving, from a serving base station, a message comprising an indication to transmit a sounding reference signal (SRS) on a set of symbols of an orthogonal frequency division multiplexing (OFDM) slot. The method also comprises receiving, from the serving base station, downlink control information (DCI) having a slot format indicator (SFI) that designates a subset of the set of symbols as flexible. The method also comprises transmitting the SRS for positioning on at least a portion of the subset.

An example mobile device, according to this disclosure, comprises a wireless transceiver, memory, and one or more processing units communicatively coupled with the wireless transceiver and the memory. The one or more processing units configured to receive, via the wireless transceiver from a serving base station, a message comprising an indication to transmit a sounding reference signal (SRS) on a set of symbols of an orthogonal frequency division multiplexing (OFDM) slot. The one or more processing units are also configured to receive, via the wireless transceiver from the serving base station, downlink control information (DCI) having a slot format indicator (SFI) that designates a subset of the set of symbols as flexible. The one or more processing units are also configured to transmit, via the wireless transceiver, the SRS for positioning on at least a portion of the subset.

An example device, according to this disclosure, comprises for receiving, from a serving base station, a message comprising an indication to transmit a sounding reference signal (SRS) on a set of symbols of an orthogonal frequency division multiplexing (OFDM) slot. The device also comprises means for receiving, from the serving base station, downlink control information (DCI) having a slot format indicator (SFI) that designates a subset of the set of symbols as flexible. The device also comprises means for transmitting the SRS for positioning on at least a portion of the subset.

An example non-transitory computer-readable medium, according to this disclosure, stores instructions comprising code for transmitting a reference signal for positioning. The instructions also comprise code for receiving, from a serving base station, a message comprising an indication to transmit a sounding reference signal (SRS) on a set of symbols of an orthogonal frequency division multiplexing (OFDM) slot. The instructions also comprise code for receiving, from the serving base station, downlink control information (DCI) having a slot format indicator (SFI) that designates a subset of the set of symbols as flexible. The instructions also comprise code for transmitting the SRS for positioning on at least a portion of the subset.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure.

As used herein, an "RF signal" or "wireless signal" comprises an electromagnetic wave that transports information through the space between a transmitter or transmitting device and a receiver or receiving device. As used herein, a transmitter may transmit an RF/wireless signal or signals to a receiver. As described in further detail herein, RF/wireless signals may comprises uplink (UL) and/or downlink (DL) signals, which may be reflective of the type of device transmitting the signals and/or receiving device receiving the signals. For each RF/wireless signal transmitted by the transmitter, the receiver may receive multiple wireless/RF signals corresponding due to the propagation characteristics of RF signals through multipath channels. The same transmitted RF signal on different paths between the transmitter and receiver may be referred to as a "multipath" RF signal.

Figure 1:
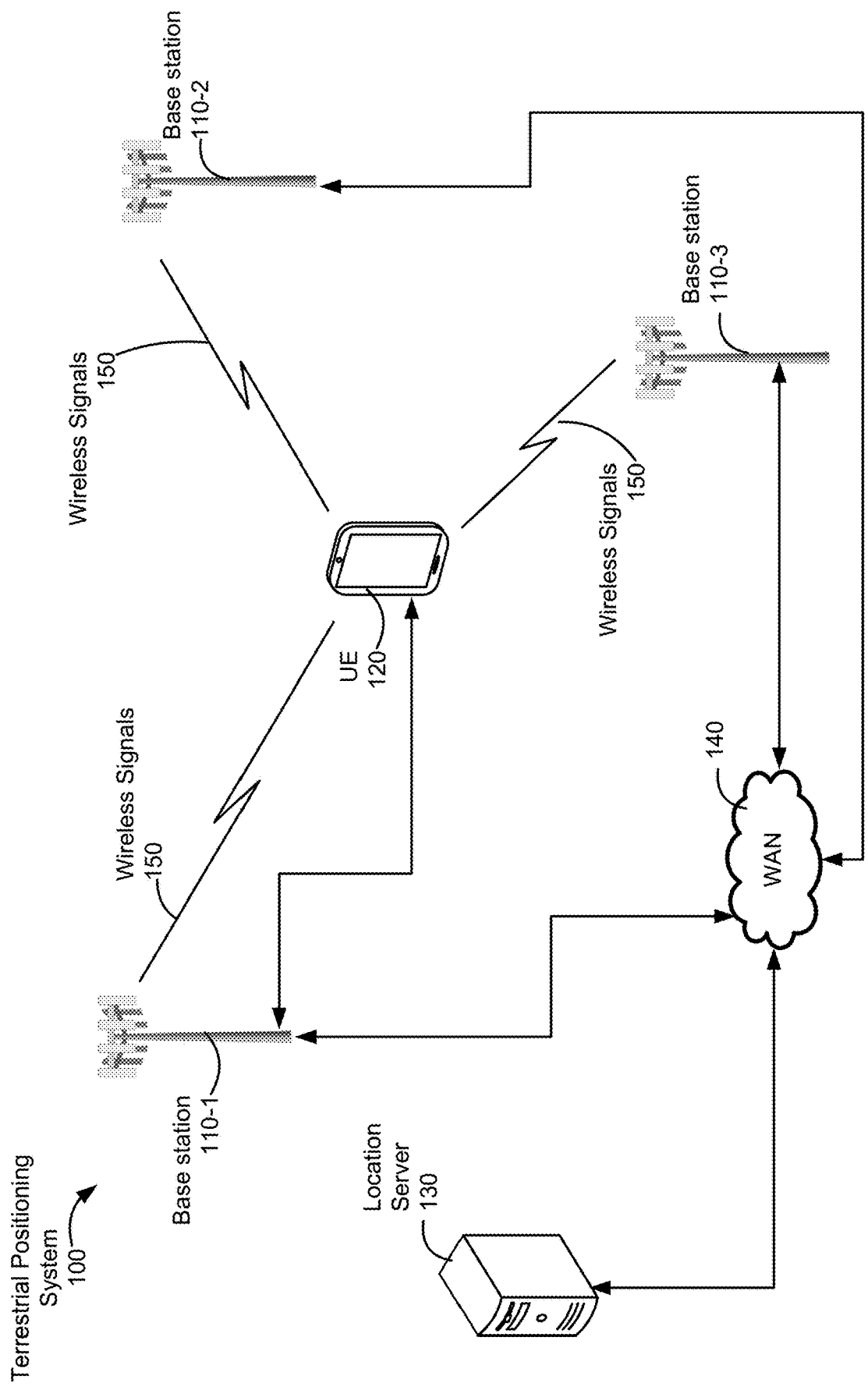
FIG. 1 is a diagram of a terrestrial positioning system, according to an embodiment.

FIG. 1 is a diagram of a terrestrial positioning system 100, according to an embodiment. Here, the terrestrial positioning system comprises portions of a wireless data communication network (e.g., mobile broadband network) having multiple transceivers, known as base stations 110-1, 110-2, and 110-3 (generically and collectively referred to herein as base stations 110), which are used to determine the location (e.g., in geographical coordinates) of a UE 120. The base stations 110 and/or the UE 120 both may be communicatively coupled with a location server 130 via a Wide Area Network (WAN) 140. As discussed in further detail below the location of the UE 120 can be determined based on wireless signals communicated between the UE 120 and the various base stations 110.

It should be noted that FIG. 1 provides a generalized illustration of various components, any or all of which may be utilized as appropriate, and each of which may be duplicated or omitted as necessary. Specifically, although one UE 120 is illustrated, it will be understood that many UEs (e.g., hundreds, thousands, millions, etc.) may utilize the terrestrial positioning system 100. Similarly, the terrestrial positioning system 100 may include a larger or smaller number base stations 110, location servers 130, and/or other components. The illustrated communication links that communicatively connect the various components in the terrestrial positioning system 100 include data and signaling connections which may include additional (intermediary) components, direct or indirect physical (wired) and/or wireless connections, and/or additional networks. Furthermore, components may be rearranged, combined, separated, substituted, and/or omitted, depending on desired functionality. Moreover, in a given scenario, the UE 120 may communicate with a larger or smaller number of base stations 110, which may still be used to determine the position of the UE 120. Generally speaking, the more base stations 110 with which the UE 120 can exchange wireless signals 150 (engaging in DL-only, UL-only, and/or DL+UL positioning methods), the more accurate the positioning of the UE 120.

The UE 120, as used herein, may be an electronic device and may be referred to as a device, a mobile device, a wireless device, a mobile terminal, a terminal, a wireless terminal, a mobile station (MS), a Secure User Plane Location (SUPL) Enabled Terminal (SET), or by some other name. Moreover, UE 120 may correspond to a cellphone, smartphone, laptop, tablet, personal data assistant (PDA), tracking device, wearable device, Internet of Things (IOT) device, or some other portable or moveable device. In some cases, a UE 120 may be part of some other entity—e.g. may be a chipset supporting a modem that is integrated into some larger mobile entity such as a vehicle, drone, package, shipment, robotic device etc. As noted, the UE 120 can support wireless communication under the 5G NR standard. That said, the UE 120 may support wireless communication using one or more additional Radio Access Technologies (RATs) such as Global System for Mobile communication (GSM), Code Division Multiple Access (CDMA), Wideband CDMA (WCDMA), Long Term Evolution (LTE), High Rate Packet Data (HRPD), IEEE 802.11 Wi-Fi, Bluetooth® (BT), Worldwide Interoperability for Microwave Access (WiMAX), etc. The UE 120 may also support wireless communication using a Wireless Local Area Network (WLAN) which may connect to other networks (e.g. the Internet) using a Digital Subscriber Line (DSL) or packet cable for example. Furthermore, although embodiments provided herein are directed toward SRS transmissions by the UE 120 under 5G NR, alternative embodiments may be extended to other forms of wireless communication.

The UE 120 may include a single entity or may include multiple entities such as in a personal area network where a user may employ audio, video and/or data I/O devices and/or body sensors and a separate wireline or wireless modem. An estimate of a location of the UE 120 may be referred to as a location, location estimate, location fix, fix, position, position estimate or position fix, and may be geodetic, thus providing location coordinates for the UE 120 (e.g., latitude and longitude) which may or may not include an altitude component (e.g., height above sea level, height above or depth below ground level, floor level or basement level). Alternatively, a location of the UE 120 may be expressed as a civic location (e.g., as a postal address or the designation of some point or small area in a building such as a particular room or floor). A location of the UE 120 may also be expressed as an area or volume (defined either geodetically or in civic form) within which the UE 120 is expected to be located with some probability or confidence level (e.g., 67%, 95%, etc.) A location of the UE 120 may further be a relative location comprising, for example, a distance and direction or relative X, Y (and, optionally, Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Depending on desired functionality, the WAN 140 may comprise any of a variety of wireless and/or wireline communication networks. The WAN 140 can, for example, comprise any combination of public and/or private networks, local and/or wide-area networks, and the like. Furthermore, the WAN 140 may utilize one or more wired and/or wireless communication technologies (such as one or more of the wireless communication technologies previously mentioned). In some embodiments, the WAN 140 may comprise a cellular or other mobile network, a WLAN, a Wireless Wide-Area Network (WWAN), and/or the Internet, for example.

Base stations 110 may comprise nodes of (or otherwise communicatively coupled to) the WAN 140, which may allow the UE 120 to communicate wirelessly with other devices linked to the WAN 140. The location of the UE 120 can further be determined using the wireless signals 150 (as described in more detail below) and known locations of the base stations 110. It can be further noted that, techniques are not necessarily limited to fixed base stations (i.e., base stations having a fixed position), but may also include mobile base stations. In a 5G NR network (e.g., where WAN 140 comprises a wireless data network supporting 5G NR communications), each base station 110 may comprise a Transmission Reception Point (TRP), such as a NR NodeB (gNB) and/or an antenna of the gNB. Additionally or alternatively, base stations 110 may comprise a node B, an Evolved Node B (eNodeB or eNB), a base transceiver station (BTS), a radio base station (RBS), or a Next Generation eNB (ng-eNB). Thus, UE 120 can send and receive information with network-connected devices, such as location server 130, by accessing the WAN 140.

Solid arrows between components indicate communication links. And, as illustrated, the UE 120 may access the WAN 140 via a first base station 110-1 (via wireless signals 150 between the UE 120 and first base station 110-1). The first base station 110-1 therefore acts as the serving base station for the UE 120. As a person of ordinary skill in the art will appreciate, other base stations 110 may become the serving base station for the UE 120, depending on factors such as the location of the UE 120. In the instance shown in FIG. 1, where the first base station 110-1 acts as the serving base station, other base stations 110-2 and 110-3 with which the UE 120 is capable of exchanging wireless signals 150 may act as neighboring base stations 110-2 and 110-3, which may provide additional throughput and bandwidth to UE 120 and/or provide the positioning functionality described herein.

The location server 130 may comprise a server and/or other computing device configured to determine an estimated location of UE 120 and/or provide data (e.g., "assistance data") to UE 120 to facilitate the location determination. According to some embodiments, location server 130 may comprise a Secure User Plane Location (SUPL) Location Platform (SLP), which may support the SUPL user plane (UP) location solution defined by the Open Mobile Alliance (OMA) and may support location services for UE 120 based on subscription information for UE 120 stored in location server 130. The location server 130 may also comprise an Enhanced Serving Mobile Location Center (E-SMLC) that supports location of UE 120 using a control plane (CP) location solution for LTE radio access by UE 120. The location server 130 may further comprise a Location Management Function (LMF) that supports location of UE 120 using a control plane (CP) location solution for 5G NR radio access by UE 120. In a CP location solution, signaling to control and manage the location of UE 120 may be exchanged between elements of WAN 140 and with UE 120 using existing network interfaces and protocols and as signaling from the perspective of WAN 140. In a UP location solution, signaling to control and manage the location of UE 120 may be exchanged between location server 130 and UE 120 as data (e.g. data transported using the Internet Protocol (IP) and/or Transmission Control Protocol (TCP)) from the perspective of WAN 140.

It can be further noted that, in some embodiments of a terrestrial positioning system 100, the location server 130 may be executed by and/or incorporated into the UE 120 itself. That is, in the embodiments described herein, the functionality of the location server 130 may be performed by the UE 120. In such instances, communication between the UE and location server may therefore occur between hardware and/or software components of the UE 120. Similarly, the functions of the location server 130 described herein may be performed by a base station 110 or other device communicatively coupled to the terrestrial positioning system 100.

Figure 2:
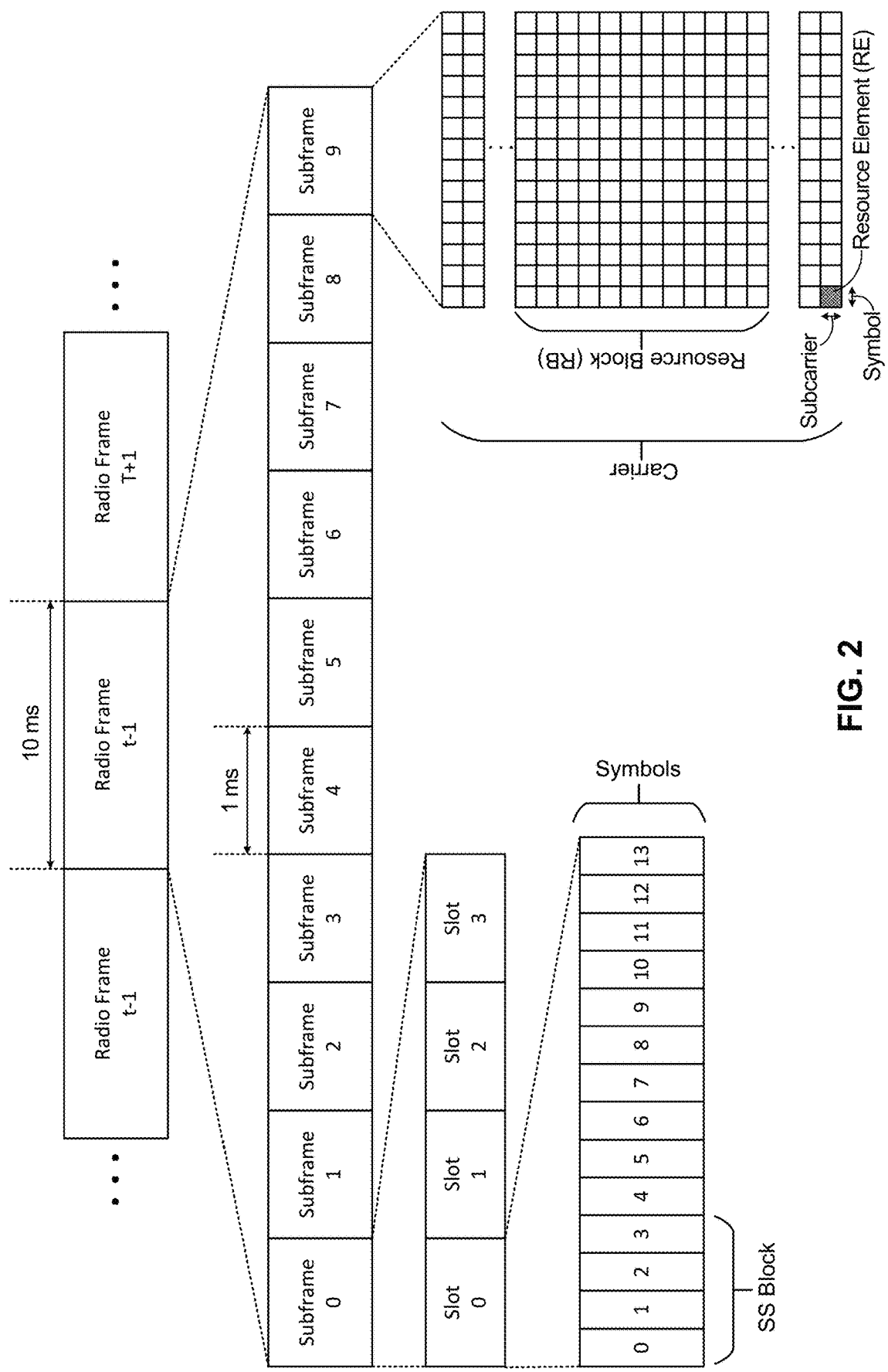
FIG. 2 is a diagram showing an example of a frame structure that can be used in wireless communication in the positioning system of FIG. 1, according to an embodiment.

FIG. 2 is a diagram showing an example of a frame structure for NR and associated terminology, which can serve as the basis for physical layer communication between the UE 120 and base stations 110, such as serving base station 210-1. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini slot may comprise a sub slot structure (e.g., 2, 3, or 4 symbols). Additionally shown in FIG. 2 is the complete Orthogonal Frequency-Division Multiplexing (OFDM) of a subframe, showing how a subframe can be divided across both time and frequency into a plurality of Resource Blocks (RBs). A single RB can comprise a grid of Resource Elements (REs) spanning 14 symbols and 12 subcarriers.

Each symbol in a slot may indicate a link direction (e.g., DL, UL, or flexible) or data transmission and the link direction for each subframe may be dynamically switched. The link directions may be based on the slot format. Each slot may include DL/UL data as well as DL/UL control information. In NR, a synchronization signal (SS) block is transmitted. The SS block includes a primary SS (PSS), a secondary SS (SSS), and a two symbol Physical Broadcast Channel (PBCH). The SS block can be transmitted in a fixed slot location, such as the symbols 0-3 as shown in FIG. 2. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as downlink system bandwidth, timing information within radio frame, SS burst set periodicity, system frame number, etc.

As previously noted, the terrestrial positioning system 100 can determine the location of the UE 120 using that positioning technologies can include DL-only, UL-only, or DL+UL positioning methods. For UL-only and DL+UL positioning methods, UL signals (signals sent from the UE 120 to the base stations 110) may comprise an SRS, which can be communicated using symbols in an OFDM slot designated for UL signaling. Positioning methods using UL signals can include, for example, UL Time Difference of Arrival (UL-TDOA), UL Angle of Arrival (UL-AoA), and Round-Trip-Time measurements (RTT) from multiple base stations (known as multi-RTT), and maybe based on time difference, AoA, Reference Signal Receive Power (RSRP), and/or other measurements of the SRS. In multi-RTT, for example, the distance between the UE 120 and each base station 110 can be determined, based in part on one or more SRS signal(s), and the location of the UE 120 may be calculated as the location satisfying the distance determinations, given the known locations of the base stations 110. In UL-TDOA, the location of the UE 120 can be calculated in a similar manner, based on a difference in time SRS signal(s) from the UE 120 is/are received at different base stations 110 (e.g., by comparing the signal received at different pairs of base stations, and determining a common solution). In UL-AoA, each base station 110 determines an angle at which SRS signal(s) from the UE 120 is/are received, and multi-angulation can be used to determine the solution that satisfies the determined angle at each base station 110.

The SRS transmitted by the UE 120 may comprise a frequency-domain reference signal sequence derived from a Zadoff-Chu sequence. Although it may be used for other purposes, the SRS can be particularly useful to determine the position of the UE 120, as previously noted. Under 5G NR, the SRS may be sent in a periodic, semi-persistent, and/or aperiodic, depending on desired functionality, and may be configured in any symbol of an NR OFDM slot. Moreover, a multi-symbol SRS resource may be staggered in frequency. The serving base station 110-1 may provide the UE 120 with information regarding how and when to transmit the SRS, and the location server 130 can inform neighboring base stations 110-2 and 110-3 of these aspects of the SRS to enable them to detect the SRS properly for position determination.

For a given frequency, the serving base station 110-1 may configure the UE 120 by performing Time Domain Division (TDD) resource designation using different layers to perform different functions. As described herein, an "upper layer" may comprise a layer of the serving base station 110-1 providing control information to the UE 120 via Radio Resource Control (RRC) protocol (e.g., an RRC layer). An upper layer may additionally include an application layer, Media Access Control (MAC) layer, or other layer capable of providing the UE 120 with the designated time for SRS signaling. Furthermore, a "lower layer" may comprise a physical layer having a scheduler that can provide Downlink Control Information (DCI) information (e.g., transport format, resource allocation, etc.) to the UE 120 via the Physical Downlink Control Channel (PDCCH). The upper layer of the serving base station 110-1 can, using RRC signaling, perform semi-static designation of time domain resource elements to implement cell-specific and/or UE-specific patterns. (The frequency at which these designations may occur may be on the order of milliseconds to hundreds of milliseconds.) The lower layer of the serving base station 110-1 can perform a dynamic designation of time domain resources on a per-slot basis (e.g., having much finer granularity than RRC signaling) using a Slot Format Indicator (SFI) in the DCI. The SFI comprises an index reference to a table that indicates designations for particular symbols within a slot.

The different designations forming these patterns comprise DL, UL, Flexible, and Reserved. DL and UL designations indicate resources for respective DL and UL communications. Thus, the UE 120 can listen to and decode information communicated using DL-designated resources, and similarly transmit data using the UL-designated resources. Reserved resources are "not transmit" and "not receive" resources the UE 120 cannot use for transmitting or receiving data. Resources designated as Flexible are neither UL nor DL resources, but may be designated as such through dynamic designation in the DCI at the lower layer. If not overwritten in this way, a Flexible designation has been traditionally used to achieve the same as a Reserve designation.

According to embodiments herein, however, a UE 120 may be configured to transmit a positioning SRS on one or more symbols of a slot designated as Flexible, thereby using an otherwise unused time resource to efficiently transmit a positioning SRS without waiting for a UL-designated resource to do so. In such instances, the UE 120 may be configured by a higher layer of the serving base station 110-1 (e.g., via an RRC configuration message) to transmit a positioning SRS. If, for a given slot, a lower layer of the serving base station 110-1 designates one or more symbols as Flexible, the UE can then transmit the positioning SRS on at least a portion of the one or more symbols. Additional details are provided in FIG. 3.

Figure 3:
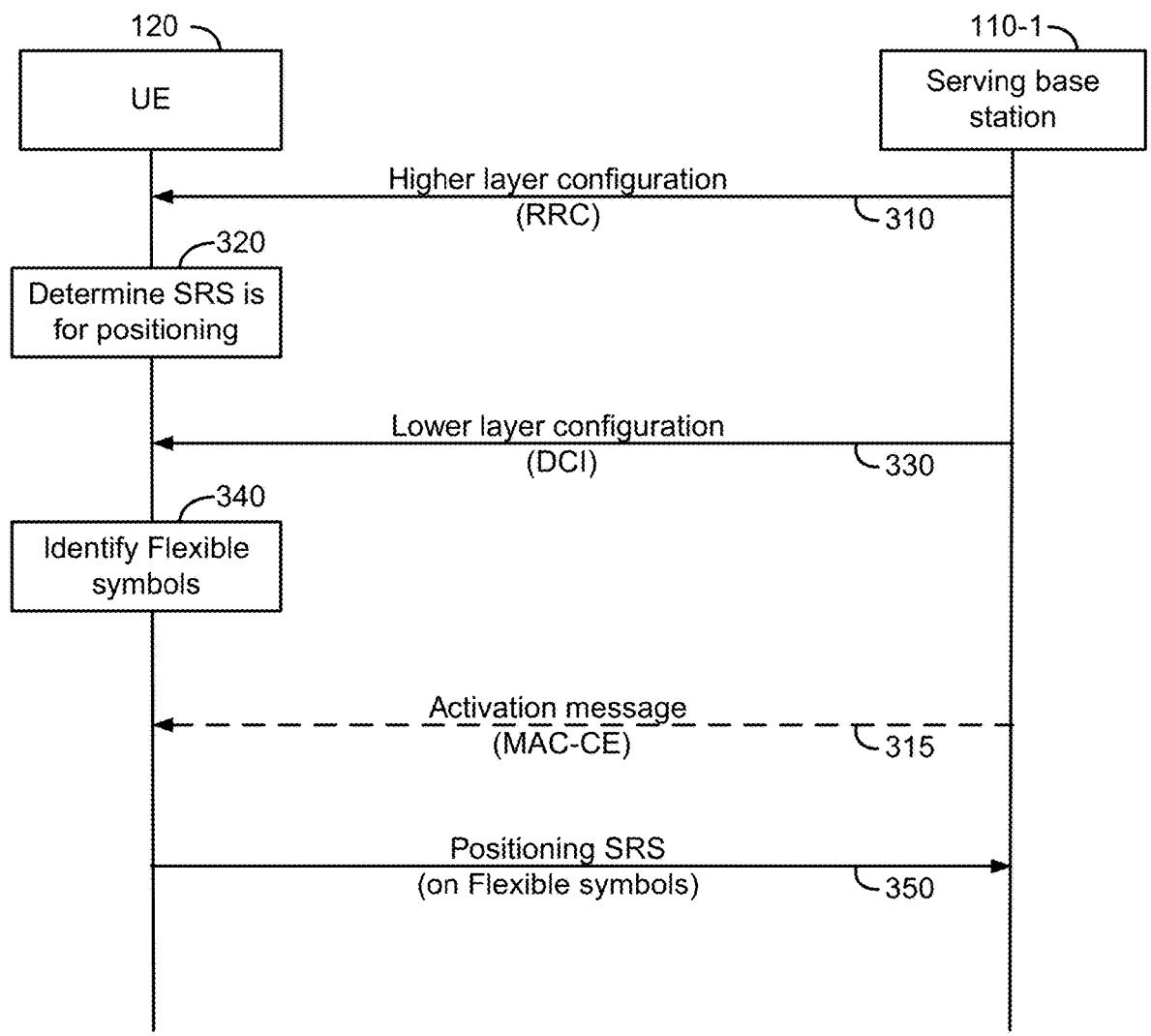
FIG. 3 is a call flow diagram illustrating a method of Sounding Reference Signal (SRS) transmission for positioning, according to an embodiment.

FIG. 3 is a call flow diagram illustrating a method of SRS transmission for positioning, according to an embodiment. It can be noted, however, that alternative embodiments may vary in function by combining, separating, or otherwise varying the functionality described in the blocks illustrated in FIG. 3 and/or information communicated in the arrows shown in FIG. 3.

The method can begin at arrow 310, where the serving base station 110-1 sends a higher layer configuration message to the UE 120. As noted, this higher layer configuration message may comprise an RRC or similar message, provided by the RRC layer, which may identify a slot in which the UE 120 is to transmit a positioning SRS, including a set of symbols within the slot with which the positioning SRS may be transmitted. In the higher layer configuration 310, the serving base station 110-1 may provide additional types of configuration, such as cell-specific RRC configuration and/or UE-specific RRC configuration, which can establish a semi-static indication as described above. A semi-static indication may be activated and deactivated via MAC Control Element (MAC-CE), as shown by arrow 315 in FIG. 3 (indicating an optional activation message for instances in which a semi-static indication is used). (It can be noted, however, that this activation message may come at any time prior to the positioning SRS, and may not necessary come after the functionality shown in block 340.) The higher layer may similarly establish a periodic indication via RRC configuration, in which case it is activated after a fixed delay upon reception of the message.

The serving base station 110-1 may distinguish the positioning SRS from other types of SRS. That is, the serving base station 110-1 may provide information to the UE 120, indicating that the SRS will be used for positioning. With the SRS flagged as a positioning SRS, the UE 120 can therefore determine the SRS is used for positioning (as indicated at block 320 of FIG. 3), and that the SRS may therefore be transmitted on symbols designated as Flexible. (If not designated as a positioning SRS, the UE 120 may refrain from transmitting an SRS on Flexible symbols, transmitting instead only on UL symbols.) It can be noted that, in some instances and/or embodiments, the determination that an SRS is used for positioning (at block 320) does not necessarily have to be made before the lower layer configuration 330 is sent from the serving base station 110-1.

Using a lower layer configuration 330 (e.g., DCI), the serving base station 110-1 can provide a dynamic indication to the UE 120 of the slot identified in the higher layer configuration 310, as well as other configuration information via the PDCCH. As noted, the dynamic indication can be provided using an SFI, which may designate a subset of the symbols identified in the higher layer configuration as Flexible.

For its part, the UE 120 can then identify symbols for the slot designated for SRS transmission designated as Flexible by the SFI in the lower layer configuration 340. Finally, as shown at arrow 350, the UE 120 can transmit at least a portion of the positioning SRS using one or more of the symbols designated as Flexible by the SFI. As noted, by so doing, the UE can utilize otherwise unused Flexible resources. This can allow the UE 120 to provide SRS more frequently, enabling the terrestrial positioning system 100 to take more SRS measurements. This can increase the accuracy in positioning and tracking of the UE 120.

Figure 4:
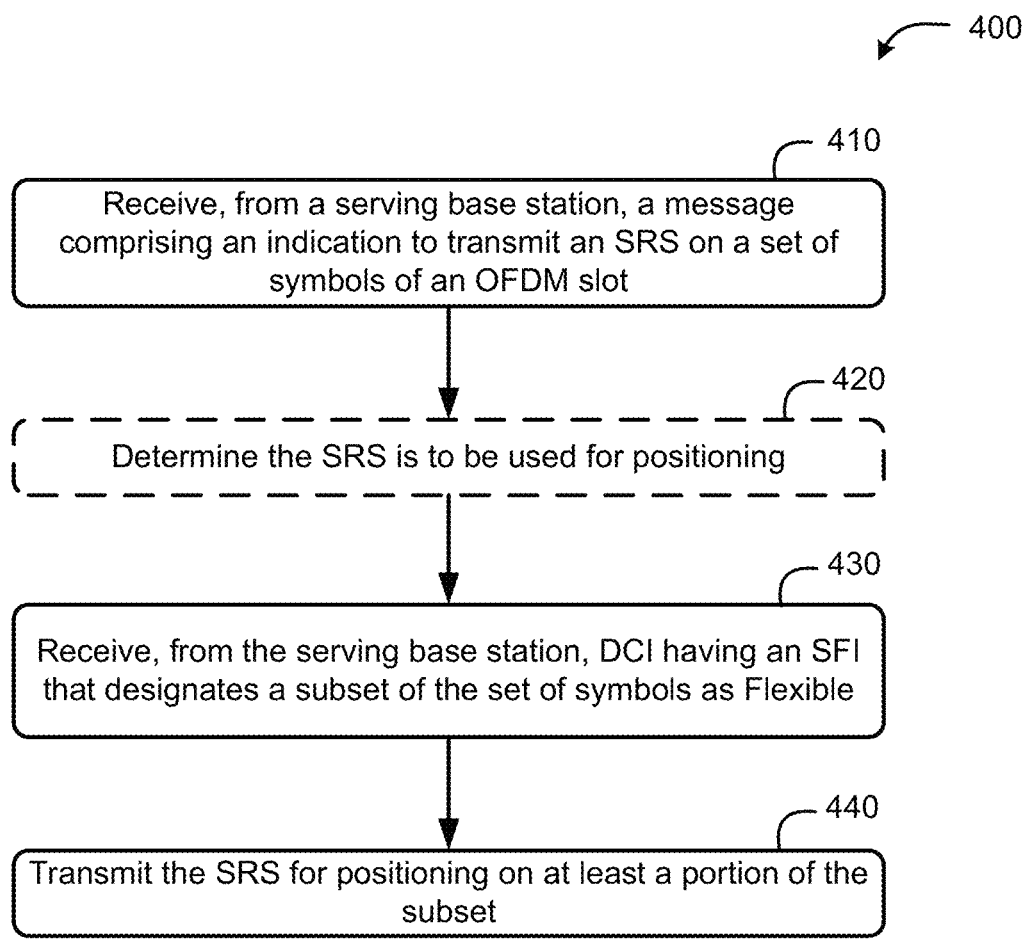
FIG. 4 is a flow diagram of a method of transmitting a reference signal for positioning, according to an embodiment.

FIG. 4 is a flow diagram of a method 400 of transmitting a reference signal for positioning, according to an embodiment. The method 400 may be performed by the UE (e.g. the UE 120) and may correspond with the functionality of the UE 120 shown in FIG. 3. As with other figures provided herein, FIG. 4 is provided as a non-limiting example. Alternative embodiments may vary in function by combining, separating, or otherwise varying the functionality described in the blocks illustrated in FIG. 4. Means for performing the functionality of one or more of the blocks illustrated in FIG. 4 may comprise hardware and/or software components of a UE, such as the UE 120 illustrated in FIG. 4 and described in more detail below. Additionally, it can be noted that the functions illustrated in FIG. 4 may be performed by a UE for the transmission of positioning SRS signals for any purpose, including for UL-only and/or UL+DL positioning.

At block 410, the functionality comprises receiving, from a serving base station, a message comprising an indication to transmit an SRS on a set of symbols of an OFDM slot. Here, the set of the symbols may comprise all or a portion of the symbols within the slot. Further, as previously noted, the message may comprise a higher layer configuration message from the serving base station, such as an RRC message. Moreover, the message may be provided periodically to configure the UE, in which may establish cell-specific RRC configuration and/or UE-specific RRC configuration. Means for performing the functionality at block 410 may include one or more software and/or hardware components of a UE, such as a bus 405, processing unit(s) 410, memory 460, wireless communication interface 430, and/or other software and/or hardware components of a UE 120 as illustrated in FIG. 4 and described in more detail below.

At block 420, the functionality optionally comprises determining the SRS to be used for positioning. As indicated in the embodiments described above, this can be done in any of a variety of ways. In some embodiments, for example, a positioning designation of the SRS may be provided in an RRC message (e.g., the message received at block 410). In such instances, a specific IE in the RRC may provide this designation. In some embodiments, the determining the SRS to be used for positioning may comprise determining the SRS is to be transmitted as part of a multi-RTT positioning session, a UL-TDOA position determination, a UL-AoA position determination, or any combination thereof. Additionally or alternatively, in some embodiments, determining the SRS to be used for positioning may comprise determining the SRS is associated with a non-serving base station (e.g., neighboring base station). In some embodiments, determining the SRS is to be used for positioning comprises determining the SRS is configured with a DL Positioning Reference Signal (PRS) which may be used not only for multi-RTT, but for other types of positioning, such as UL AoA, RSRP, or more. This may mean, for example, that the serving base station provides the UE with the configuration of the SRS and DL PRS in the same message. Whether the SRS is going to be used as part of a particular position determination, positioning session, or the like, or is associated with another base station, maybe provided to the UE 120 via an entity coordinating a positioning determination, such as a location server 130. Means for performing the functionality at block 420 may include one or more software and/or hardware components of a UE, such as, bus 405, processing unit(s) 410, memory 460, and/or other software and/or hardware components of a UE 120 as illustrated in FIG. 4 and described in more detail below.

At block 430, the functionality comprises receiving, from the serving base station, DCI having an SFI that designates a subset of the set of symbols as Flexible. As noted, the relevant 3GPP standard allows symbols of a slot to be designated as UL, DL, Flexible, or Reserved. Moreover, a lower layer may, using the SFI, redesignate Flexible symbols as UL or DL. However, if left as Flexible under SFI, the UE can utilize them for SRS transmissions, as described herein. Means for performing the functionality at block 430 may include one or more software and/or hardware components of a UE, such as, bus 405, processing unit(s) 410, memory 460, wireless communication interface 430, and/or other software and/or hardware components of a UE 120 as illustrated in FIG. 4 and described in more detail below.

At block 440, the functionality comprises transmitting the SRS on at least a portion of the subset. In some instances, for example, the UE may transmit the SRS on one of many symbols designated as Flexible by SFI, in which comprise a subset of the symbols designated for transmitting a positioning SRS by an upper layer of the serving base station.

Additionally, in some embodiments, transmitting the SRS maybe further based on receiving an indication, from the serving base station, that transmitting the SRS on Flexible symbols is allowable. That is, embodiments may "turn on" this functionality as desired. As previously noted, this can be done using an IE in an RRC message from the base station (which may be the same or different message than the message sent at block 410). Additionally or alternatively, this can be done using MAC-CE from the serving base station. (This can be included, for example, in the activation message 315 of FIG. 3, or in a separate MAC-CE.)

In some embodiments, this functionality may be employed based on a particular version of the relevant 3GPP standard, and therefore, the UE may implement this functionality based on a determination that the serving base station supports the particular version of the standard. In particular, this functionality may be incorporated into release 16 or 17 of 3GPP specification TS 28.213. As such, this functionality may be implemented if the UE determines the serving base station supports release 16, 17 (or greater). This determination can be based on information received from the serving base station and/or location server (which may include, for example, the higher layer configuration 310, lower-layer configuration 330, and/or activation message 315 of FIG. 3). In some embodiments, for example, one or more information elements (IEs) in the higher layer configuration 310 may provide this information (e.g., SRS-PosResourceSet-r16).

Means for performing the functionality at block 440 may include one or more software and/or hardware components of a UE, such as, bus 405, processing unit(s) 410, memory 460, wireless communication interface 430, and/or other software and/or hardware components of a UE 120 as illustrated in FIG. 4 and described in more detail below.

Figure 5:
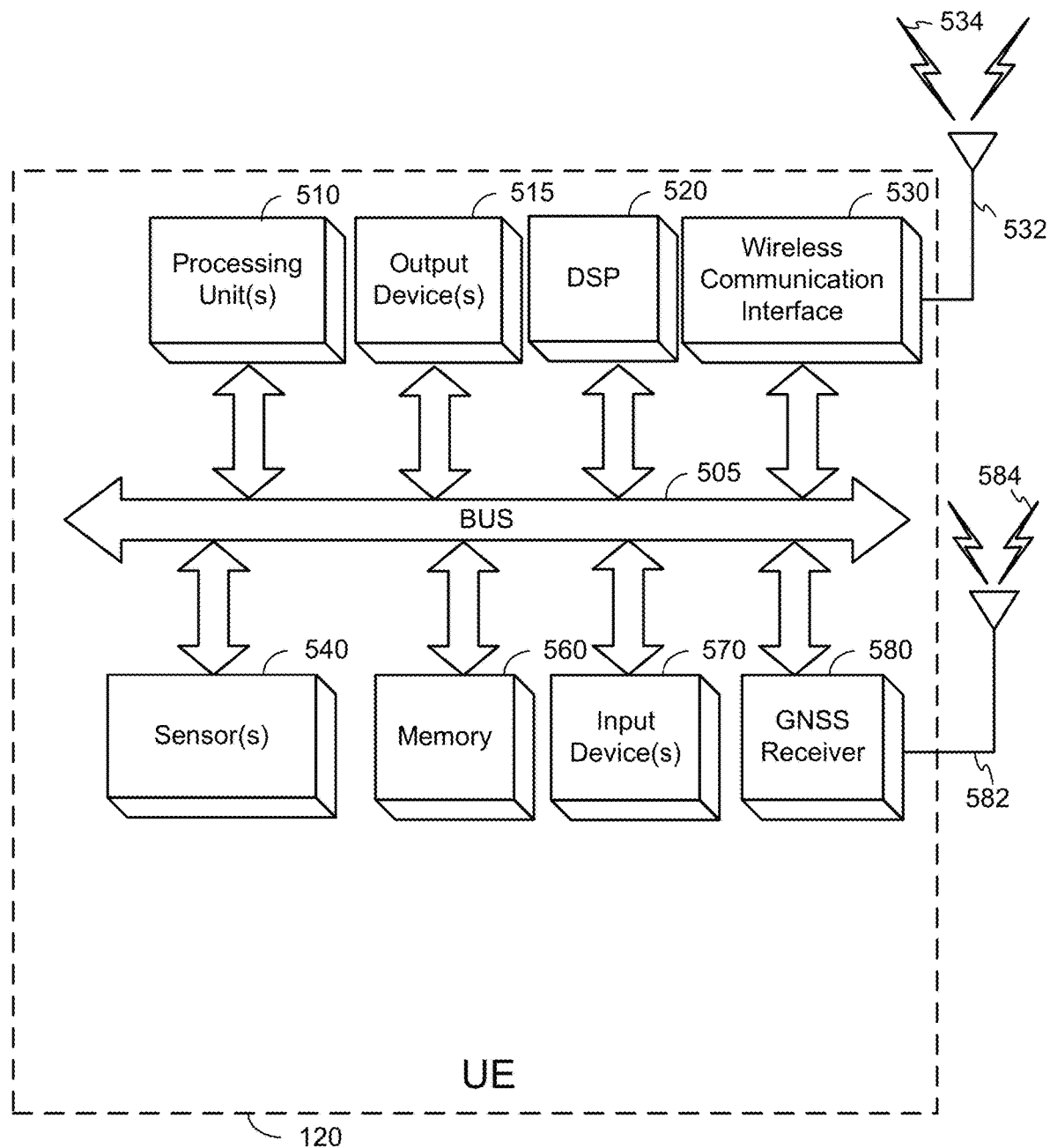
FIG. 5 is a block diagram of an embodiment of a user equipment (UE), which can be utilized as described herein.

FIG. 5 illustrates an embodiment of a UE 120, which can be utilized as described herein above (e.g. in association with FIGS. 1-5). For example, the UE 120 can perform one or more of the functions of method 400 of FIG. 4. It should be noted that FIG. 5 is meant only to provide a generalized illustration of various components, any or all of which may be utilized as appropriate. It can be noted that, in some instances, components illustrated by FIG. 5 can be localized to a single physical device and/or distributed among various networked devices, which may be disposed at different physical locations. Furthermore, similar to the serving base station described herein, the UE may comprise various layers (physical layer, MAC layer, IP layer, application layer, etc.), which may be executed by one or more of the hardware and/or software components illustrated in FIG. 5.

The UE 120 is shown comprising hardware elements that can be electrically coupled via a bus 505 (or may otherwise be in communication, as appropriate). The hardware elements may include a processing unit(s) 510 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 5, some embodiments may have a separate Digital Signal Processor (DSP) 520, depending on desired functionality. Location determination and/or other determinations based on wireless communication may be provided in the processing unit(s) 510 and/or wireless communication interface 530 (discussed below). The UE 120 also can include one or more input devices 570, which can include without limitation a keyboard, touch screen, a touch pad, microphone, button(s), dial(s), switch(es), and/or the like; and one or more output devices 515, which can include without limitation a display, light emitting diode (LED), speakers, and/or the like.

The UE 120 may also include a wireless communication interface 530, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device and/or various cellular devices, etc.), and/or the like, which may enable the UE 120 to communicate with other devices as described in the embodiments above. The wireless communication interface 530 may permit data and signaling to be communicated (e.g. transmitted and received) with a network, for example, via eNBs, gNBs, ng-eNBs, access points, various base stations and/or other access node types, and/or other network components, computer systems, and/or any other electronic devices described herein. The communication can be carried out via one or more wireless communication antenna(s) 532 that send and/or receive wireless signals 534. According to some embodiments, the wireless communication antenna(s) 532 may comprise a plurality of discrete antennas, antenna arrays, or any combination thereof.

Depending on desired functionality, the wireless communication interface 530 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 120 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more radio access technologies (RATs) such as CDMA2000, WCDMA, and so on. Cdma2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from the Third Generation Partnership Project (3GPP). Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 120 can further include sensor(s) 540. Sensors 540 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to complement and/or facilitate the position determination described herein, in some instances.

Embodiments of the UE 120 may also include a Global Navigation Satellite System (GNSS) receiver 580 capable of receiving signals 584 from one or more GNSS satellites using an antenna 582 (which could be the same as antenna 532). Positioning based on GNSS signal measurement can be utilized to complement and/or incorporate the techniques described herein. The GNSS receiver 580 can extract a position of the UE 120, using conventional techniques, from GNSS SVs of a GNSS system, such as Global Positioning System (GPS), Galileo, GLONASS, Quasi-Zenith Satellite System (QZSS) over Japan, Indian Regional Navigational Satellite System (IRNSS) over India, Beidou over China, and/or the like. Moreover, the GNSS receiver 580 can be used with various augmentation systems (e.g., a Satellite Based Augmentation System (SBAS)) that may be associated with or otherwise enabled for use with one or more global and/or regional navigation satellite systems, such as, e.g., WAAS, EGNOS, Multi-functional Satellite Augmentation System (MSAS), and Geo Augmented Navigation system (GAGAN), and/or the like.

The UE 120 may further include and/or be in communication with a memory 560. The memory 560 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 560 of the UE 120 also can comprise software elements (not shown in FIG. 5), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 560 that are executable by the UE 120 (and/or processing unit(s) 510 or DSP 520 within UE 120). In an aspect, then, such code and/or instructions can be used to configure and/or adapt a general purpose computer (or other device) to perform one or more operations in accordance with the described methods.

Figure 6:
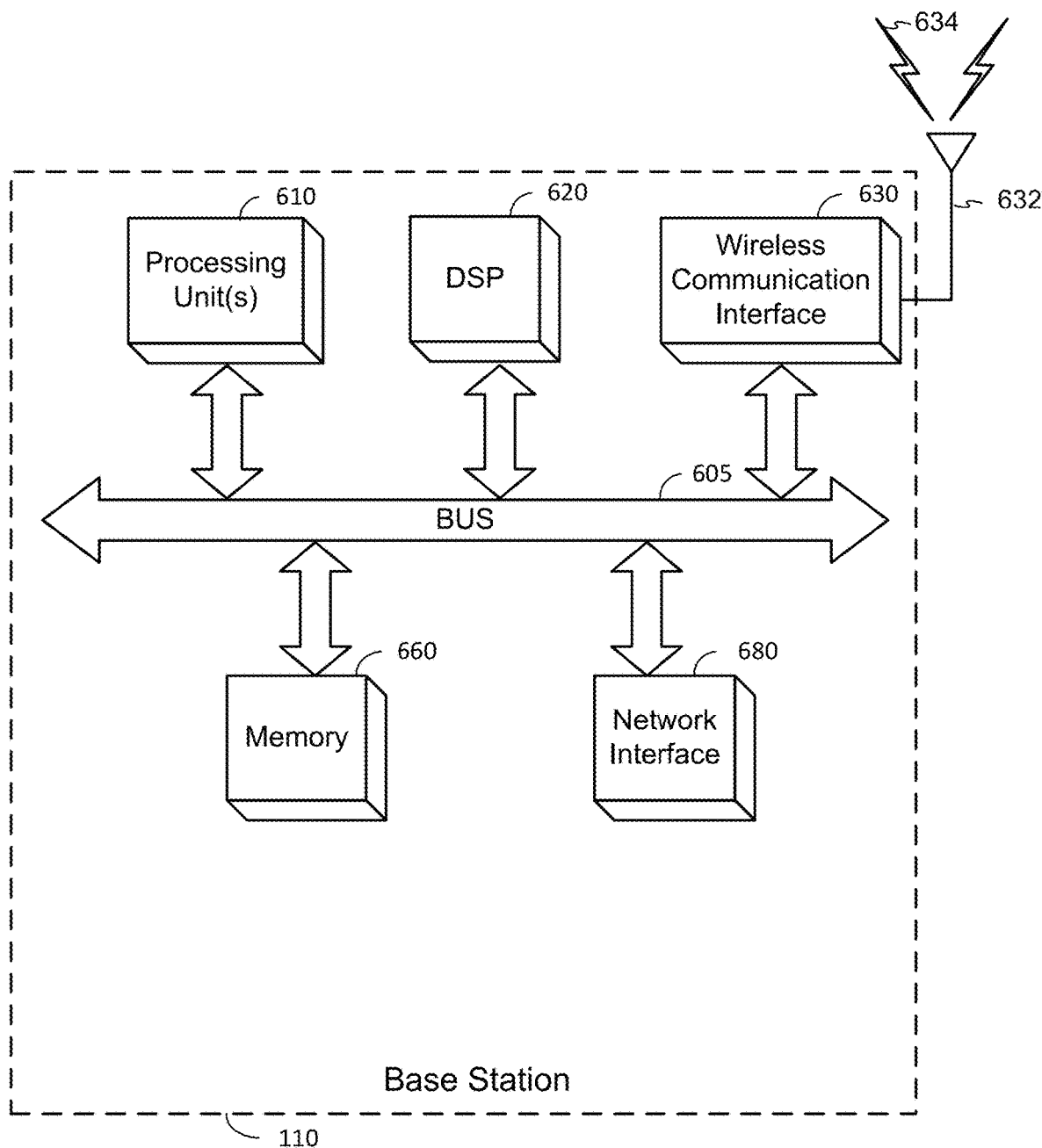
FIG. 6 is a block diagram of an embodiment of a base station, which can be utilized as described herein.

FIG. 6 illustrates an embodiment of a base station 110, which can be utilized as described herein above (e.g., in association with FIGS. 1-5). It should be noted that FIG. 6 is meant only to provide a generalized illustration of various components, any or all of which may be utilized as appropriate. In some embodiments, the base station 110 may correspond to a gNB, an ng-eNB, and/or an eNB. As noted, a base station 110 may comprise various layers (physical layer, MAC layer, IP layer, application layer, etc.), which may be executed by one or more of the hardware and/or software components illustrated in FIG. 6.

The base station 110 is shown comprising hardware elements that can be electrically coupled via a bus 605 (or may otherwise be in communication, as appropriate). The hardware elements may include a processing unit(s) 610 which can include without limitation one or more general-purpose processors, one or more special-purpose processors (such as DSP chips, graphics acceleration processors, ASICs, and/or the like), and/or other processing structure or means. As shown in FIG. 6, some embodiments may have a separate DSP 620, depending on desired functionality. Location determination and/or other determinations based on wireless communication may be provided in the processing unit(s) 610 and/or wireless communication interface 630 (discussed below), according to some embodiments. The base station 110 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 110 might also include a wireless communication interface 630, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 110 to communicate as described herein. The wireless communication interface 630 may permit data and signaling to be communicated (e.g. transmitted and received) UEs, other base stations (e.g., eNBs, gNBs, and ng-eNBs), and/or other network components, computer systems, and/or any other electronic devices described herein. The communication can be carried out via one or more wireless communication antenna(s) 632 that send and/or receive wireless signals 634.

The base station 110 may also include a network interface 680, which can include support of wireline communication technologies. The network interface 680 may include a modem, network card, chipset, and/or the like. The network interface 680 may include one or more input and/or output communication interfaces to permit data to be exchanged with a network, communication network servers, computer systems, and/or any other electronic devices described herein.

In many embodiments, the base station 110 may further comprise a memory 660. The memory 660 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 660 of the base station 110 also may comprise software elements (not shown in FIG. 6), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 660 that are executable by the base station 110 (and/or processing unit(s) 610 or DSP 620 within base station 110). In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method at a user equipment (UE) of transmitting a reference signal for positioning, the method comprising: receiving, from a serving base station, a message comprising an indication to transmit a Sounding Reference Signal (SRS) on a set of symbols of an Orthogonal Frequency Division Multiplexing (OFDM) slot; receiving, from the serving base station, Downlink Control Information (DCI) having a Slot Format Indicator (SFI) that designates a subset of the set of symbols as flexible; and transmitting the SRS for positioning on at least a portion of the subset.

Clause 2. The method of clause 1, wherein the message comprises a Radio Resource Control (RRC) message.

Clause 3. The method of clause 1 or 2, further comprising determining the SRS is to be used for positioning based, at least in part, on identifying a positioning designation of the SRS in the RRC message.

Clause 4. The method of any of clauses 1-3, wherein the positioning designation comprises an Information Element (IE) in the RRC message.

Clause 5. The method of any of clauses 1-4, further comprising determining the SRS is to be used for positioning based, at least in part, on determining the SRS is to be transmitted as part of: a multi-RTT positioning session, an Uplink Time Difference of Arrival (UL-TDOA) position determination, an Uplink Angle of Arrival (UL-AoA) position determination, or any combination thereof.

Clause 6. The method of any of clauses 1-4, further comprising determining the SRS is to be used for positioning based, at least in part, on determining the SRS is configured with a Downlink (DL) Positioning Reference Signal (PRS).

Clause 7. The method of any of clauses 1-4, further comprising determining the SRS is to be used for positioning based, at least in part, on determining the SRS is associated with a non-serving base station.

Clause 8. The method of any of clauses 1-7, wherein transmitting the SRS is further based on receiving an indication, from the serving base station, that transmitting the SRS on Flexible symbols is allowable.

Clause 9. The method of any of clauses 1-8, wherein transmitting the SRS is further based on receiving an indication that the serving base station supports a version of a data communication standard in which transmitting the SRS on Flexible symbols is allowable.

Clause 10. The method of clause 9, wherein the indication that transmitting the SRS on Flexible symbols is allowable is conveyed using an IE in a second message received from the serving base station.

Clause 11. The method of clause 9, wherein the indication that transmitting the SRS on Flexible symbols is allowable is conveyed using a Media Access Control (MAC) Control Element (MAC-CE) from the serving base station.

Clause 12. A mobile device comprising: a wireless transceiver; a memory; and one or more processing units communicatively coupled with the wireless transceiver and the memory, the one or more processing units configured to: receive, via the wireless transceiver from a serving base station, a message comprising an indication to transmit a Sounding Reference Signal (SRS) on a set of symbols of an Orthogonal Frequency Division Multiplexing (OFDM) slot; receive, via the wireless transceiver from the serving base station, Downlink Control Information (DCI) having a Slot Format Indicator (SFI) that designates a subset of the set of symbols as flexible; and transmit, via the wireless transceiver, the SRS for positioning on at least a portion of the subset.

Clause 13. The mobile device of clause 12, wherein, to receive the message, the one or more processing units are configured to receive a Radio Resource Control (RRC) message.

Clause 14. The mobile device of clause 12 or 13, wherein the one or more processing units are configured to determine the SRS is to be used for positioning based, at least in part, on identifying a positioning designation of the SRS in the RRC message.

Clause 15. The mobile device of any of clauses 12-14, wherein, to identify a positioning designation of the SRS in the RRC message the one or more processing units are configured to identify an Information Element (IE) in the RRC message.

Clause 16. The mobile device of any of clauses 12-15, wherein the one or more processing units are configured to determine the SRS is to be used for positioning based, at least in part, on determining the SRS is to be transmitted as part of: a multi-RTT positioning session, an Uplink Time Difference of Arrival (UL-TDOA) position determination, an Uplink Angle of Arrival (UL-AoA) position determination, or any combination thereof.

Clause 17. The mobile device of any of clauses 12-15, wherein the one or more processing units are configured to determine the SRS is to be used for positioning based, at least in part, on determining the SRS is configured with a Downlink (DL) Positioning Reference Signal (PRS).

Clause 18. The mobile device of any of clauses 12-15, wherein the one or more processing units are configured to determine the SRS is to be used for positioning based, at least in part, on determining the SRS is associated with a non-serving base station.

Clause 19. The mobile device of any of clauses 12-18, wherein the one or more processing units are configured to transmit the SRS further based on receiving an indication, via the wireless transceiver from the serving base station, that transmitting the SRS on Flexible symbols is allowable.

Clause 20. The mobile device of any of clauses 12-19, wherein the one or more processing units are configured to transmit the SRS further based receiving an indication, via the wireless transceiver, that the serving base station supports a version of a data communication standard in which transmitting the SRS on Flexible symbols is allowable.

Clause 21. The mobile device of clause 20, wherein the one or more processing units are configured to receive the indication that transmitting the SRS on Flexible symbols is allowable via an IE in a second message received from the serving base station.

Clause 22. The mobile device of clause 20, wherein the one or more processing units are configured to receive the indication that transmitting the SRS on Flexible symbols is allowable via a Media Access Control (MAC) Control Element (MAC-CE) from the serving base station.

Clause 23. A device comprising: means for receiving, from a serving base station, a message comprising an indication to transmit a Sounding Reference Signal (SRS) on a set of symbols of an Orthogonal Frequency Division Multiplexing (OFDM) slot; means for receiving, from the serving base station, Downlink Control Information (DCI) having a Slot Format Indicator (SFI) that designates a subset of the set of symbols as flexible; and means for transmitting the SRS for positioning on at least a portion of the subset.

Clause 24. The device of clause 23, wherein the means for receiving the message comprise means for receiving a Radio Resource Control (RRC) message, further comprising means for determining the SRS is to be used for positioning based, at least in part, on identifying a positioning designation of the SRS in the RRC message.

Clause 25. The device of clause 23 or 24, wherein the means for identifying the positioning designation comprises means for identifying an Information Element (IE) in the RRC message.

Clause 26. The device of clause any of clauses 23-25, further comprising means for determining the SRS is to be used for positioning based, at least in part, on determining the SRS is to be transmitted as part of: a multi-RTT positioning session, an Uplink Time Difference of Arrival (UL-TDOA) position determination, an Uplink Angle of Arrival (UL-AoA) position determination, or any combination thereof.

Clause 27. The device of any of clauses 23-26, further comprising means for determining the SRS is to be used for positioning based, at least in part, on determining the SRS is configured with a Downlink (DL) Positioning Reference Signal (PRS).

Clause 28. The device of any of clauses 23-26, further comprising means for determining the SRS is to be used for positioning based, at least in part, on determining the SRS is associated with a non-serving base station.

Clause 29. A non-transitory computer-readable medium storing instructions for transmitting a reference signal for positioning, the instructions comprising code for: receiving, from a serving base station, a message comprising an indication to transmit a Sounding Reference Signal (SRS) on a set of symbols of an Orthogonal Frequency Division Multiplexing (OFDM) slot; receiving, from the serving base station, Downlink Control Information (DCI) having a Slot Format Indicator (SFI) that designates a subset of the set of symbols as flexible; and transmitting the SRS for positioning on at least a portion of the subset.

Clause 30. The non-transitory computer-readable medium of clause 29, wherein the code for receiving the message comprise code for receiving a Radio Resource Control (RRC) message, further comprising code for determining the SRS is to be used for positioning based, at least in part, on identifying a positioning designation of the SRS in the RRC message.

What is claimed is:

1. A method at a user equipment (UE) of transmitting a reference signal for positioning, the method comprising:
   receiving, from a serving base station, a message comprising an indication to transmit a Sounding Reference Signal (SRS) on a set of symbols of an Orthogonal Frequency Division Multiplexing (OFDM) slot;
   receiving, from the serving base station, Downlink Control Information (DCI) having a Slot Format Indicator (SFI) that designates a subset of the set of symbols as flexible; and
   transmitting the SRS for positioning on at least a portion of the subset.

2. The method of claim 1, wherein the message comprises a Radio Resource Control (RRC) message.

3. The method of claim 2, further comprising determining the SRS is to be used for positioning based, at least in part, on identifying a positioning designation of the SRS in the RRC message.

4. The method of claim 3, wherein the positioning designation comprises an Information Element (IE) in the RRC message.

5. The method of claim 1, further comprising determining the SRS is to be used for positioning based, at least in part, on determining the SRS is to be transmitted as part of:
   a multi-Round-Trip-Time (multi-RTT) positioning session,
   an Uplink Time Difference of Arrival (UL-TDOA) position determination,
   an Uplink Angle of Arrival (UL-AoA) position determination,
   or any combination thereof.

6. The method of claim 1, further comprising determining the SRS is to be used for positioning based, at least in part, on determining the SRS is configured with a Downlink (DL) Positioning Reference Signal (PRS).

7. The method of claim 1, further comprising determining the SRS is to be used for positioning based, at least in part, on determining the SRS is associated with a non-serving base station.

8. The method of claim 1, wherein transmitting the SRS is further based on receiving an indication, from the serving base station, that transmitting the SRS on Flexible symbols is allowable.

9. The method of claim 1, wherein transmitting the SRS is further based on receiving an indication that the serving base station supports a version of a data communication standard in which transmitting the SRS on Flexible symbols is allowable.

10. The method of claim 8, wherein the indication that transmitting the SRS on Flexible symbols is allowable is conveyed using an IE in a second message received from the serving base station.

11. The method of claim 8, wherein the indication that transmitting the SRS on Flexible symbols is allowable is conveyed using a Media Access Control (MAC) Control Element (MAC-CE) from the serving base station.

12. A mobile device comprising:
a wireless transceiver;
a memory; and
one or more processing units communicatively coupled with the wireless transceiver and the memory, the one or more processing units configured to:
receive, via the wireless transceiver from a serving base station, a message comprising an indication to transmit a Sounding Reference Signal (SRS) on a set of symbols of an Orthogonal Frequency Division Multiplexing (OFDM) slot;
receive, via the wireless transceiver from the serving base station, Downlink Control Information (DCI) having a Slot Format Indicator (SFI) that designates a subset of the set of symbols as flexible; and
transmit, via the wireless transceiver, the SRS for positioning on at least a portion of the subset.

13. The mobile device of claim 12, wherein, to receive the message, the one or more processing units are configured to receive a Radio Resource Control (RRC) message.

14. The mobile device of claim 13, wherein the one or more processing units are configured to determine the SRS is to be used for positioning based, at least in part, on identifying a positioning designation of the SRS in the RRC message.

15. The mobile device of claim 14, wherein, to identify a positioning designation of the SRS in the RRC message the one or more processing units are configured to identify an Information Element (IE) in the RRC message.

16. The mobile device of claim 12, wherein the one or more processing units are configured to determine the SRS is to be used for positioning based, at least in part, on determining the SRS is to be transmitted as part of:
a multi-Round-Trip-Time (multi-RTT) positioning session,
an Uplink Time Difference of Arrival (UL-TDOA) position determination,
an Uplink Angle of Arrival (UL-AoA) position determination,
or any combination thereof.

17. The mobile device of claim 12, wherein the one or more processing units are configured to determine the SRS is to be used for positioning based, at least in part, on determining the SRS is configured with a Downlink (DL) Positioning Reference Signal (PRS).

18. The mobile device of claim 12, wherein the one or more processing units are configured to determine the SRS is to be used for positioning based, at least in part, on determining the SRS is associated with a non-serving base station.

19. The mobile device of claim 12, wherein the one or more processing units are configured to transmit the SRS further based on receiving an indication, via the wireless transceiver from the serving base station, that transmitting the SRS on Flexible symbols is allowable.

20. The mobile device of claim 12, wherein the one or more processing units are configured to transmit the SRS further based receiving an indication, via the wireless transceiver, that the serving base station supports a version of a data communication standard in which transmitting the SRS on Flexible symbols is allowable.

21. The mobile device of claim 19, wherein the one or more processing units are configured to receive the indication that transmitting the SRS on Flexible symbols is allowable via an IE in a second message received from the serving base station.

22. The mobile device of claim 19, wherein the one or more processing units are configured to receive the indication that transmitting the SRS on Flexible symbols is allowable via a Media Access Control (MAC) Control Element (MAC-CE) from the serving base station.

23. A device comprising:
means for receiving, from a serving base station, a message comprising an indication to transmit a Sounding Reference Signal (SRS) on a set of symbols of an Orthogonal Frequency Division Multiplexing (OFDM) slot;
means for receiving, from the serving base station, Downlink Control Information (DCI) having a Slot Format Indicator (SFI) that designates a subset of the set of symbols as flexible; and
means for transmitting the SRS for positioning on at least a portion of the subset.

24. The device of claim 23, wherein the means for receiving the message comprise means for receiving a Radio Resource Control (RRC) message, further comprising means for determining the SRS is to be used for positioning based, at least in part, on identifying a positioning designation of the SRS in the RRC message.

25. The device of claim 24, wherein the means for identifying the positioning designation comprises means for identifying an Information Element (IE) in the RRC message.

26. The device of claim 23, further comprising means for determining the SRS is to be used for positioning based, at least in part, on determining the SRS is to be transmitted as part of:
a multi-Round-Trip-Time (multi-RTT) positioning session,
an Uplink Time Difference of Arrival (UL-TDOA) position determination,
an Uplink Angle of Arrival (UL-AoA) position determination,
or any combination thereof.

27. The device of claim 23, further comprising means for determining the SRS is to be used for positioning based, at least in part, on determining the SRS is configured with a Downlink (DL) Positioning Reference Signal (PRS).

28. The device of claim 23, further comprising means for determining the SRS is to be used for positioning based, at least in part, on determining the SRS is associated with a non-serving base station.

29. A non-transitory computer-readable medium storing instructions for transmitting a reference signal for positioning, the instructions comprising code for:
receiving, from a serving base station, a message comprising an indication to transmit a Sounding Reference Signal (SRS) on a set of symbols of an Orthogonal Frequency Division Multiplexing (OFDM) slot;
receiving, from the serving base station, Downlink Control Information (DCI) having a Slot Format Indicator (SFI) that designates a subset of the set of symbols as flexible; and
transmitting the SRS for positioning on at least a portion of the subset.

30. The non-transitory computer-readable medium of claim 29, wherein the code for receiving the message comprise code for receiving a Radio Resource Control (RRC) message, further comprising code for determining the SRS is to be used for positioning based, at least in part, on identifying a positioning designation of the SRS in the RRC messages.

* * * * *